United States Patent
Lacy et al.

(10) Patent No.: US 6,428,917 B1
(45) Date of Patent: Aug. 6, 2002

(54) REGULATING THE MAXIMUM OUTPUT CURRENT OF A FUEL CELL STACK

(75) Inventors: Robert A. Lacy, Scotia; Russel H. Marvin, Voorheesville, both of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/472,759

(22) Filed: Dec. 27, 1999

(51) Int. Cl.[7] .................................................. H01M 8/04
(52) U.S. Cl. ......................................... 429/13; 429/23
(58) Field of Search ............................. 429/13, 22, 23

(56) References Cited

U.S. PATENT DOCUMENTS

| | | | |
|---|---|---|---|
| 4,198,597 A | 4/1980 | Sawyer | |
| 4,670,702 A | 6/1987 | Yamada et al. | |
| 4,741,978 A | 5/1988 | Takabayashi | 429/23 |
| 4,839,246 A | 6/1989 | Takabayashi | 429/12 |
| 4,839,574 A | 6/1989 | Takabayashi | 429/23 X |
| 4,883,724 A | 11/1989 | Yamamoto | 429/23 |
| 4,904,548 A | 2/1990 | Tajima | 429/22 |
| 4,988,283 A | 1/1991 | Nagasawa et al. | 429/17 |
| 5,010,470 A | 4/1991 | Lipman et al. | |
| 5,156,928 A | * 10/1992 | Takabayashi | 429/23 |
| 5,198,970 A | 3/1993 | Kawabata et al. | |
| 5,290,641 A | 3/1994 | Harashima | 429/17 |
| 5,334,463 A | 8/1994 | Tajima et al. | 429/9 |
| 5,366,821 A | 11/1994 | Merritt et al. | 429/21 |
| 5,624,768 A | 4/1997 | Tanokura | 429/23 |
| 5,714,874 A | 2/1998 | Bonnefoy | |

FOREIGN PATENT DOCUMENTS

JP      08-096823     * 4/1996

OTHER PUBLICATIONS

Translation of Japanese 08–096823, from Internet Site of Japanese Patent Office, Apr. 1996.*

* cited by examiner

Primary Examiner—Stephen Kalafut
(74) Attorney, Agent, or Firm—Trop, Pruner & Hu, P.C

(57) ABSTRACT

A method includes establishing a fuel flow through a fuel cell stack to produce a current. The voltages of the fuel cell stack are scanned to determine the minimum cell voltage. A maximum limit on the current is set based at least in part on the minimum cell voltage.

26 Claims, 3 Drawing Sheets

REGULATING THE MAXIMUM OUTPUT CURRENT OF A FUEL CELL STACK

BACKGROUND

The invention relates to regulating the maximum output current of a fuel cell stack.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

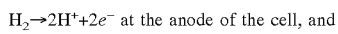

$H_2 \rightarrow 2H^+ + 2e^-$ at the anode of the cell, and

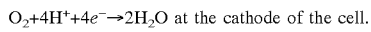

$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically A coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

The fuel cell stack may be part of a fuel cell system that supplies power to a load, such as house, for example. In this manner, among its various components, the fuel cell system may include an inverter to convert the DC voltage that furnished by the stack into AC voltages that may be furnished to the house. The fuel cell system may also include a reformer to convert a hydrocarbon (natural gas or propane, as examples) into a hydrogen gas flow. The hydrogen gas flow needs to be large enough to satisfy the stoichiometry dictated by the above-described equation. Therefore, higher current levels require larger flow rates and thus, require more hydrogen production by the reformer.

The fuel cell system typically monitors the output power of the system and regulates the production of the reformer based on the monitored power. Thus, an increased power demand from the house typically requires an increase in the production by the reformer. A conventional reformer may have a relatively slow transient response that causes any increase in production to significantly lag the increased demand for power. As a result, when the power that is demanded by the house suddenly increases, the fuel cell stack may "starve" due to the lack of a sufficient hydrogen flow until the production of hydrogen by the reformer increases to the appropriate level. This fuel starvation, in turn, may damage fuel cells of the stack.

Thus, there is a continuing need for an arrangement that addresses one or more of the problems that are stated above.

SUMMARY

In an embodiment of the invention, a method includes establishing a fuel flow through a fuel cell stack to produce a current. The cell voltages of the fuel cell stack are scanned to determine the minimum cell voltage. The current is limited to a maximum current limit that is based on the minimum cell voltage.

Advantages and other features of the invention will become apparent from the following description, from the drawing and from the claims.

DETAILED DESCRIPTION

Figure 1:
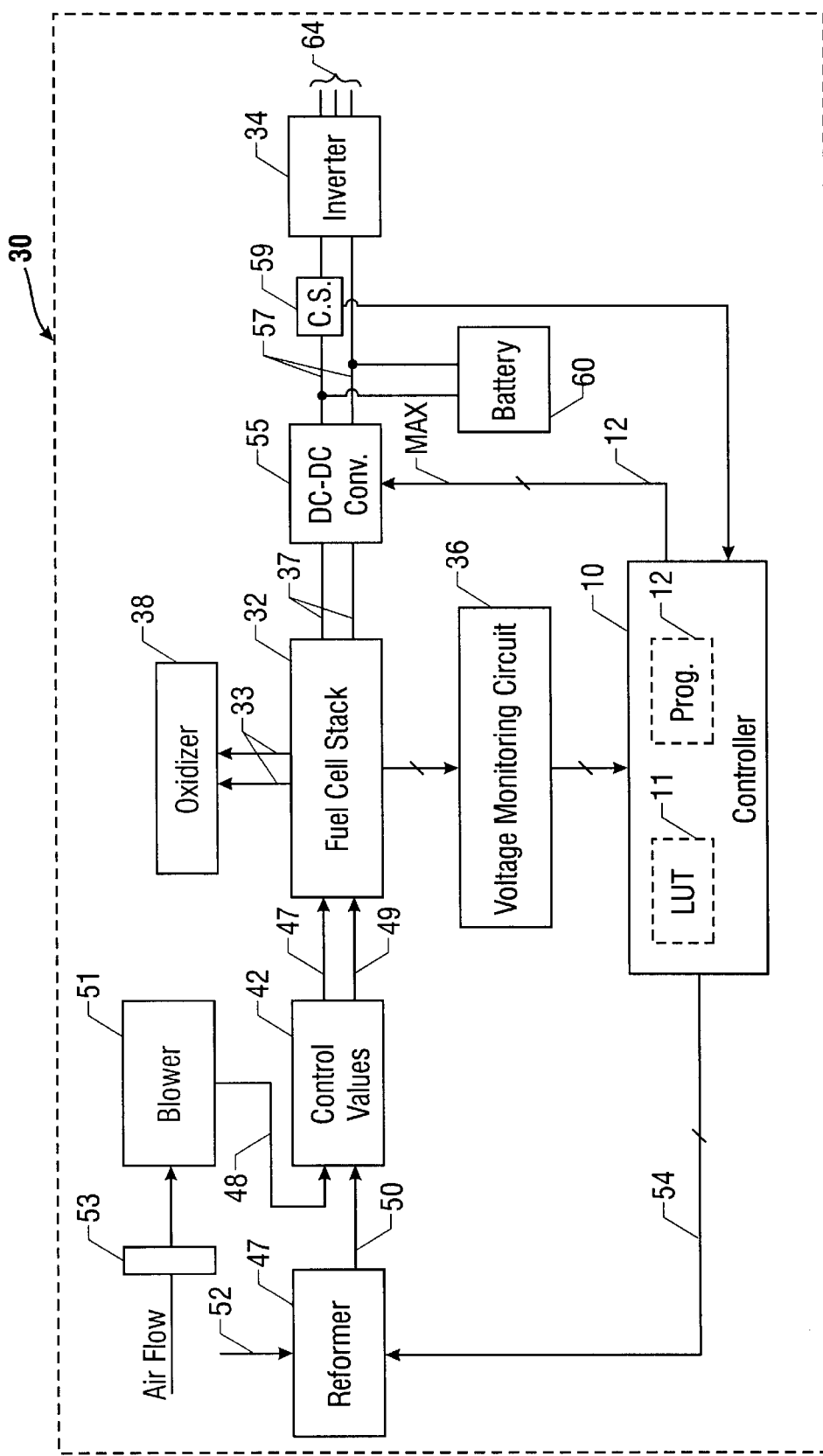
FIG. 1 is a schematic diagram of a fuel cell system according to an embodiment of the invention.

Referring to FIG. 1, an embodiment 30 of a fuel cell system in accordance with the invention includes a fuel cell stack 32 that consumes reactants (hydrogen and air, as examples) in chemical reactions that produce electricity. As an example, output terminals 64 of the fuel cell system 30 may be coupled to provide output power to an electrical load, such as a house, for example. The power that is demanded by the house may vary over time and thus, the cell current of the fuel cell stack 32 is not constant but rather, varies over time. A controller 10 (of the fuel cell system 30) monitors the output power of the fuel cell system 30 and controls a reformer 47 accordingly to regulate the hydrogen flow into the fuel cell stack 32. However, the reformer 47 may have relatively slow transient response. Therefore, when the power that is demanded by the house increases suddenly, the reformer 47 may not respond quickly enough to prevent the fuel cells of the stack 32 from receiving a sufficient hydrogen flow if not for the current limiting features of the fuel cell system 30 that are described below.

Figure 2:
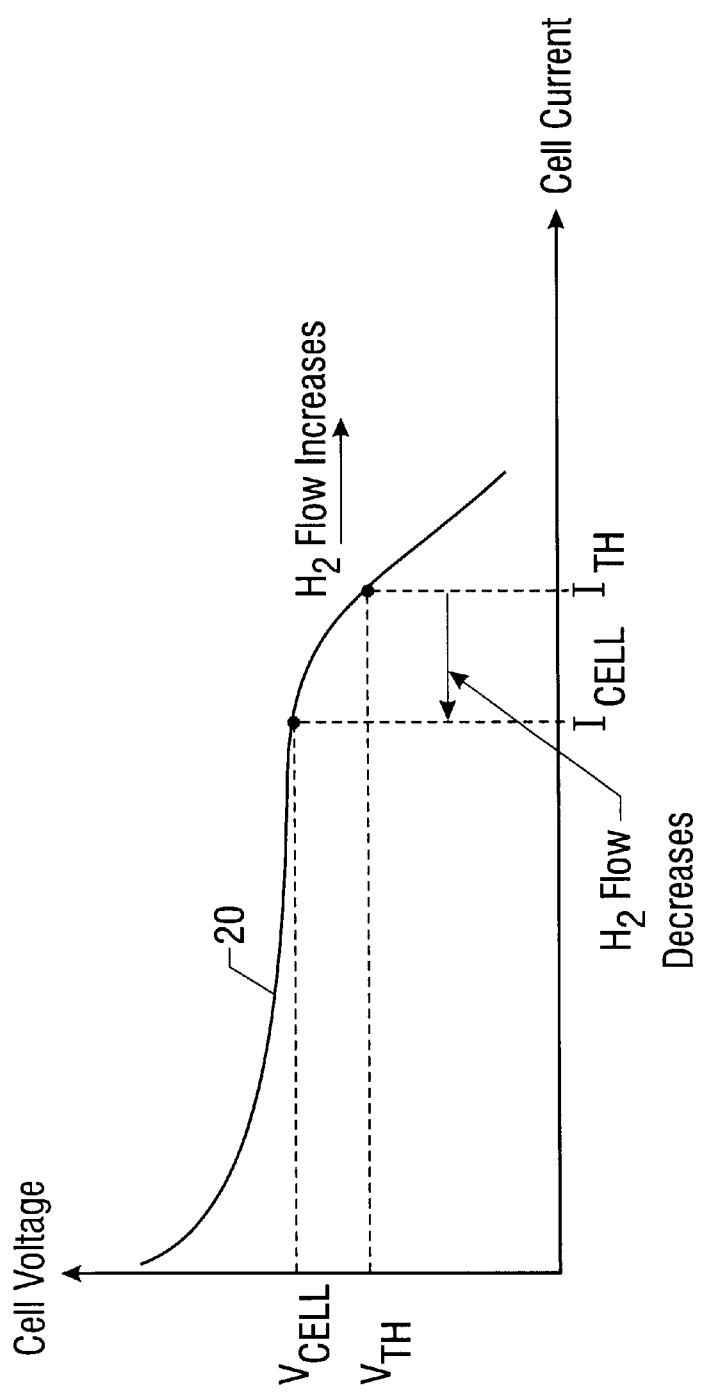
FIG. 2 is a polarization plot of a fuel cell of the fuel cell stack of FIG. 1 according to an embodiment of the invention.

More particularly, because the fuel cells of the fuel cell stack 32 are electrically coupled together in series, the cells have the same cell current. In this manner, each fuel cell may be characterized by a cell voltage versus cell current plot, called a polarization curve, such as an exemplary polarization curve 20 that is depicted in FIG. 2. As shown, the terminal voltage of the cell generally decreases with an increasing cell current. An exemplary operating point of the fuel cell is depicted in FIG. 2, an operating point in which the cell has a terminal voltage called $V_{CELL}$ and a current called $I_{CELL}$. The $V_{CELL}$ voltage is above a threshold voltage (called $V_{TH}$) that defines a breakpoint between a healthy fuel cell and an unhealthy fuel cell. In this manner, the health, efficiency and general safety of the fuel cell stack 32 may suffer if one of the cell voltages decreases below the $V_{TH}$ voltage, a condition that could occur, for example, when there is a current draw greater than a threshold current (called $I_{TH}$)

To prevent this scenario from occurring, the controller 10 places a maximum limit on the cell current to keep the minimum cell voltage (among all of the cell voltages of the fuel cell stack 32 from decreasing below the $V_{TH}$ threshold voltage. The controller's choice of the maximum current limit is not static, but rather, the choice of the maximum current limit may depend on other parameters, such as the minimum cell voltage, as described below.

In this manner, the polarization curve 20 that is depicted in FIG. 2 is for a particular hydrogen flow. As an example, for this given hydrogen flow, the controller 10 may set the maximum current limit near $I_{TH}$, the current level at the $V_{TH}$ threshold voltage. However, the polarization curve for a given fuel cell is not static, but rather, changes in the hydrogen flow cause the polarization curve for a given fuel cell to generally translate, or shift, along the current axis of the polarization curve. Using the polarization curve 20 as an example, an increase in the hydrogen flow shifts the curve 20 in a positive direction along the cell current axis to generally increase the level of the $I_{TH}$ threshold current level. A decrease in the hydrogen flow shifts the curve 20 in a negative direction along the cell current axis to generally decrease the level of the $I_{TH}$ threshold current level. Thus, an increase in the hydrogen flow generally causes the controller 10 to increase the maximum cell current limit, and a decrease in the hydrogen flow generally causes the controller 10 to decrease the maximum cell current limit.

To accomplish the above-described current limiting, in some embodiments, the controller 10 sets a maximum current limit of a DC-to-DC converter 55 (see FIG. 1) of the fuel cell system 30. In this manner, the converter 55 is coupled to output terminals 37 of the fuel cell stack 32 to receive a DC voltage from the stack 32. The converter 55 regulates and may shift the received DC voltage level to provide a regulated voltage to output terminals 57 that are coupled to an inverter 34. For purposes of setting the maximum current limit, the controller 10 furnishes a signal (called MAX) that may be, for example, a current or voltage signal that is received by the converter 55 and indicates the maximum cell current limit. In this manner, the MAX signal is used to set the maximum output current of the converter 55, thereby establishing the maximum limit on the cell current. When the output current of the converter 55 is limited, a battery 60 of the fuel cell system 30 supplies any additional current, as needed, to satisfy the power demand of the load that is coupled to the output terminals 64. As an example, the terminals of the battery 60 may be coupled to the output terminals 57 of the converter 55.

The above-described control loop prevents the fuel cell stack 32 from "starving" from a lack of a sufficient hydrogen flow due to an increase in the power that is demanded by the load. In this manner, the maximum limit that is placed on the cell current accommodates the transient response of the reformer 47 and allows time for the reformer 47 to "catch up" in its production of hydrogen gas. As the reformer 47 increases the hydrogen flow in response to an increase in the power demand, the controller 10 may increase the maximum current limit. Thus, the fuel cell system 30 has at least two control loops: a first quick response control loop to limit sudden changes in the output power, an event that may "starve" the fuel cell stack 32 due to the relatively slow response of the reformer 47; and a second possibly slower control loop to control the reformer 47 to regulate the hydrogen flow into the fuel cell stack 32.

As the controller 10 may at least partially base the maximum current limit on the minimum cell voltage. For purposes of monitoring the cell voltages and determining the minimum cell voltage, the controller 10 may use a voltage monitoring circuit 36 of the fuel system 30. The voltage monitoring circuit 36 is coupled to the fuel cell stack 32 to continually measures the cell voltages and to also provide indications of the measured cell voltages to the controller 10. Either the voltage monitoring circuit 36 or the controller 10 (depending on the particular embodiment) may determine the minimum cell voltage, a voltage that the controller 10 uses to regulate the power output of the fuel cell system 30.

Figure 3:
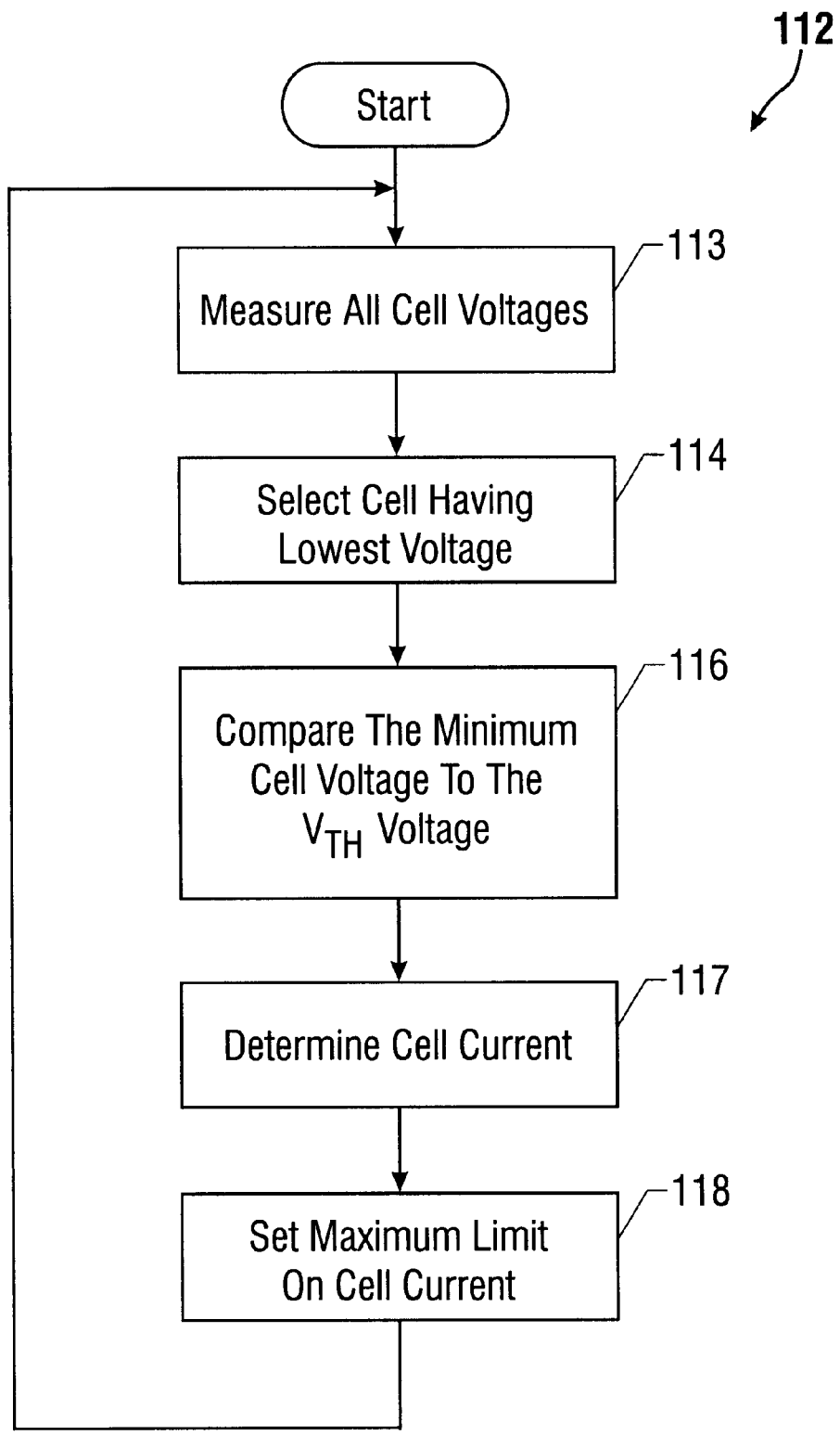
FIG. 3 is a flow diagram illustrating a control scheme according to an embodiment of the invention.

Referring also to FIG. 3, in this manner, the controller 10 may execute a program 12 (stored in a read only memory (ROM) of the controller 10, for example) that causes the controller 10 to use the voltage monitoring circuit 36 (see FIG. 2) to measure (block 13 of FIG. 3) all of the cell voltages of the fuel cell stack 32. From this information, the program 12 may also cause the controller 10 to select (block 14) the cell that has the minimum voltage, compare (block 16) the minimum cell voltage to the $V_{TH}$ threshold voltage, determine (block 17) the cell current (via a current sensor 59 (see FIG. 1), for example) and set (block 18) the cell current limit based on these factors. In some embodiments, the controller 10 may not use the cell current as a factor when setting the maximum current limit, and in some embodiments, the controller 10 may periodically retrieve indications of the measured voltages and/or an indication of the lowest cell voltage from the voltage monitoring circuit 36.

In some embodiments, the controller 10 regulates the minimum cell voltage to keep this voltage within an error band of voltages about a setpoint voltage, a voltage near the minimum threshold voltage. In the course of this regulation, when the minimum cell voltage becomes high enough to rise above the error band, the controller 10 increases the current limit. Conversely, when the lowest cell voltage becomes low enough to decrease below the error band, the controller 10 decreases the current limit.

When changing the current limit, in some embodiments, the controller 10 may adjust the current limit by an incremental amount that is a predetermined percentage (five percent, for example) of the maximum rated stack current. In other embodiments, the controller 10 may base the amount of change on other criteria or may base the change on a predetermined value.

In some embodiments, the controller 10 may use a proportional-integral-derivative (PID) control scheme, a heuristic control scheme or a look-up table (LUT) 11 (see FIG. 1) to perform the above-described dynamic current limiting. As examples, the LUT 11 may be stored in a read only memory (ROM) or a random access memory (RAM) of the fuel cell system 30, such as a memory of the controller 10. In some embodiments, the controller 10 may also be connected to a hydrogen sensor (not shown) in the anode exhaust. As an example, if the hydrogen concentration in the anode exhaust falls below a predetermined threshold (e.g., eight percent), the controller 10 can decrease the current limit. In this way, the hydrogen sensor can provide additional feedback to prevent the current draw on the stack 32 from starving the cells.

The cell voltages may vary over the lifetime and/or operating conditions of the fuel cell stack 32. Thus, over time, different cells may furnish the minimum cell voltage. However, because the controller 10 bases its control on the most recently determined minimum voltage cell, the control by the controller 10 accounts for this occurrence. Thus, in some embodiments, the controller 10 dynamically determines the minimum cell voltage during the course of regulation.

Referring back to FIG. 1, among the other features of the fuel cell system 30, the inverter 34 converts the DC power that is provided by the fuel cell stack 32 into AC power that is furnished to a load, such a residential load, for example. The controller 40 may interact with the reformer 47 via one or more control lines 54 to control the hydrogen gas production of the reformer 47 based on the power that is demanded by the load. To determine the power demand, the controller 10 may use the current sensor 59 that is coupled inline with one of the output terminals 57 of the DC-to-DC converter 55, for example. As examples, the DC-to-DC converter 55 may be a Buck or a Boost switching voltage regulator. An oxidizer 38 of the fuel cell system 30 may receive (via exhaust conduits 33) and oxidize unconsumed reactants and products from the fuel cell stack 32.

The fuel cell system 30 may also include control valves 42 that receive (via a conduit 48) an air flow from a blower 51 that receives filtered air through a filter 53 (a high efficiency particulate arresting (HEPA) filter, for example). The air flow supplies oxygen, a reactant, to the fuel cell stack 32. The control valves 42 also receive a hydrogen gas flow from a conduit 50 that extends from the reformer 47. The control valves 42 supply the hydrogen gas and air flows to outlet conduits 49 and 41, respectively, that deliver these reactants to the appropriate reactant manifold passageways of the fuel cell stack 32. As an example, the controller 10 may include one or more microcontrollers and/or microprocessors.

Other embodiments are within the scope of the following claims. For example, the fuel cell system 30 may provide power to an automobile instead of a house. Other arrangements are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    establishing a fuel flow through a fuel cell stack to produce a current;
    scanning cell voltages of the fuel cell stack to determine the lowest minimum voltage of the cell voltages; and
    setting a maximum limit on the current based at least in part on the lowest voltage.

2. The method of claim 1, wherein the establishing comprises:
    regulating the fuel flow based on the output power, wherein the regulation has a transient response and the setting the maximum limit prevents the fuel cell stack from receiving an insufficient fuel flow due to the transient response.

3. The method of claim 1, wherein the scanning comprises:
    continually monitoring the cell voltages during the regulation to dynamically determine the lowest voltage.

4. The method of claim 1, wherein the lowest voltage may be associated with different fuel cells of the fuel system over time.

5. The method of claim 1, wherein the setting the maximum limit prevents the cell voltages from decreasing below a minimum threshold voltage.

6. The method of claim 1, wherein the setting the maximum limit prevents the minimum cell voltage from decreasing below a minimum threshold voltage.

7. The method of claim 1, further comprising:
    using a DC-to-DC voltage converter to receive an output voltage from the fuel cell stack and provide a predetermined voltage level at an output terminal of the converter.

8. The method of claim 7, wherein the setting the maximum current limit comprises:
    establishing a maximum output current of the DC-to-DC voltage converter.

9. The method of claim 1, further comprising:
    providing a battery to supplement the fuel cell stack to provide additional current beyond the maximum limit.

10. The method of claim 1, wherein the setting the maximum limit comprises:
    increasing the maximum limit when the lowest voltage increases.

11. The method of claim 1, wherein the setting the maximum limit comprises:
    decreasing the maximum limit when the lowest voltage decreases.

12. The method of claim 1, wherein the setting the maximum limit comprises:
    increasing the maximum limit when the fuel flow increases.

13. The method of claim 1, wherein the setting the maximum limit comprises:
    decreasing the maximum limit when the fuel flow decreases.

14. The method of claim 1, further comprising measuring a hydrogen concentration in an anode exhaust flow and adjusting the maximum current limit based on the measured hydrogen concentration.

15. A fuel cell system comprising:
    a fuel cell stack adapted to produce a current in response to a fuel flow; and
    a circuit coupled to the fuel cell stack and adapted to:
        determine cell voltages of the fuel cell stack,
        select the lowest voltage of the cell voltages, and
        set a maximum limit on the current based on at least in part the lowest voltage.

16. The fuel cell system of claim 15, further comprising:
    a reformer to furnish the fuel flow, the reformer having a transient response, wherein the circuit sets the maximum limit to prevent the fuel cell stack from receiving an insufficient fuel flow due to the transient response.

17. The fuel cell system of claim 15, wherein the circuit comprises:
a voltage monitoring circuit adapted to continually monitor the cell voltages during the regulation to dynamically determine the lowest voltage.

18. The fuel cell system of claim 15, wherein the lowest voltage may be associated with different fuel cells of the fuel system over time.

19. The fuel cell system of claim 15, further comprising:
a DC-to-DC voltage regulator coupled to the fuel cell stack to furnish output power in response to power received from the stack.

20. The fuel cell system of claim 15, wherein the circuit prevents the cell voltages from decreasing below a minimum threshold voltage.

21. The fuel cell system of claim 15, wherein the circuit prevents the lowest voltage from decreasing below a minimum threshold voltage.

22. The fuel cell system of claim 15, wherein the circuit is adapted to increase the maximum limit when the lowest voltage increases.

23. The fuel cell system of claim 15, wherein the circuit is adapted to decrease the maximum limit when the fuel flow decreases.

24. The fuel cell system of claim 15, wherein the circuit is adapted to increase the maximum limit when the fuel flow increases.

25. The fuel cell system of claim 15, wherein the circuit is adapted to decrease the maximum limit when the fuel flow decreases.

26. The fuel cell system of claim 15, further comprising:
a sensor adapted to measure a hydrogen concentration in an anode exhaust flow; and
the circuit being further adapted to adjust the maximum current limit based on the measured hydrogen concentration.

* * * * *